United States Patent [19]

Malson

[11] Patent Number: 4,876,014

[45] Date of Patent: Oct. 24, 1989

[54] METHOD AND APPARATUS FOR PRODUCING ULTRAPURE WATER

[75] Inventor: William S. Malson, Warren, Mich.

[73] Assignee: Water Systems Development Corporation, Fraser, Mich.

[21] Appl. No.: 170,948

[22] Filed: Mar. 21, 1988

[51] Int. Cl.[4] .......................................... C02F 9/00
[52] U.S. Cl. ........................... 210/668; 210/685; 210/686; 210/694; 210/748; 210/961; 210/266; 210/284; 210/285; 210/286; 210/900
[58] Field of Search ............... 210/668, 685, 686, 694, 210/266, 284–286, 900, 96.1, 748

[56] References Cited

U.S. PATENT DOCUMENTS

| | | | |
|---|---|---|---|
| 661,189 | 11/1900 | Olsen | 210/266 |
| 703,654 | 7/1902 | Hall | 210/416.3 |
| 1,090,283 | 3/1914 | Crandall | 210/284 |
| 2,566,371 | 9/1951 | Quinn | 210/113 |
| 2,670,081 | 2/1954 | Quinn | 210/120 |
| 2,691,445 | 10/1954 | Eickemeyer | 210/195 |
| 3,190,320 | 6/1965 | Burgess | 141/1 |
| 3,245,537 | 4/1966 | Burgess | 210/85 |
| 3,334,745 | 8/1967 | Burgess | 210/93 |
| 3,355,018 | 11/1967 | Smith | 210/94 |
| 3,428,557 | 2/1969 | Rivers | 210/59 |
| 3,483,984 | 12/1969 | Wolkenhaver | 210/168 |
| 3,842,870 | 10/1974 | Burgess | 141/286 |
| 3,870,033 | 3/1975 | Faylor et al. | 210/900 |
| 4,033,878 | 7/1977 | Foreman | 210/321 A |
| 4,062,771 | 12/1977 | Saupe | 210/23 F |
| 4,082,666 | 8/1978 | Jones | 210/93 |
| 4,129,501 | 12/1978 | Haynes | 210/23 R |
| 4,133,754 | 1/1979 | Bory | 210/36 |
| 4,152,264 | 5/1979 | Hanna | 210/170 |
| 4,218,317 | 8/1980 | Kirschmann | 210/117 |
| 4,274,970 | 6/1981 | Beitzel | 210/748 |
| 4,280,912 | 7/1981 | Berry | 210/662 |
| 4,390,432 | 6/1983 | Takeguchi | 210/748 |
| 4,400,270 | 8/1983 | Hillman | 210/103 |
| 4,482,809 | 11/1984 | Maarschalkerweerd | 250/436 |
| 4,535,247 | 8/1985 | Kurtz | 250/455.1 |
| 4,548,716 | 10/1985 | Boeve | 210/900 |
| 4,622,133 | 11/1986 | Furuno | 210/900 |
| 4,714,550 | 12/1987 | Malson | 210/244 |

Primary Examiner—Ivars Cintins
Attorney, Agent, or Firm—Basile and Hanlon

[57] ABSTRACT

A method for purifying water or other aqueous media in which a stream of the aqueous media is introduced into a fixed bed of a purification media and turbulent flow through the fixed bed is induced to permit intimate contact between the aqueous media and the purification media. Also disclosed is an apparatus for purifying the aqueous media which includes an outer housing having an inlet aperture and an outlet aperture; a multi-chamber purification unit disposed within the housing, and means for measuring the purity of aqueous media treated within the multi-chamber unit.

16 Claims, 5 Drawing Sheets

METHOD AND APPARATUS FOR PRODUCING ULTRAPURE WATER

BACKGROUND OF THE INVENTION

1. Field of the Invention

The present invention relates to a method and apparatus for producing high purity water. More particularly, this invention relates to a method and apparatus for eliminating contaminants in water by contacting the water with a variety of purifying media for predetermined periods of time.

2. Summary of the Prior Art

High purity or ultrapure water is necessary for a variety of reasons in commercial and residential applications. The standard method for measurement of ultrapure water is water having a specific resistance measured in megohms above a specified value. An 18.3 megohm resistance is the highest purity achievable with ion exchange resins presently available. In general, high purity water has a resistance of 10 megohms while a resistance of 18 megohms is required in the electronics industry. Another method for measuring water purity is by the determination of the total dissolved solids (TDS) present in the water. These dissolved solids are generally present as ions in the water. The quantity, total dissolved solids, is expressed as parts per million. Various analytical processes require high purity water, as the contaminants in conventional water interfere with accurate analysis. Hospitals also require water having purity levels between 1 megohm and 18 megohms. The purity of the water necessary to meet hospital requirements varies with the particular application. For instance, hemodialysis and various blood workups require 18 megohm water.

In addition to commercial applications, there has been a marked increase in the demand for high-purity drinking water among private residential customers. Individuals desire water free from the contaminants and additives generally found in drinking water derived from municipal sources. It is felt that these additives and contaminants impart unpleasant tastes to the water and detract from its overall quality. Many consider that the additives and contaminants present in municipal water are detrimental to an individual's general health.

Various methods have been proposed for obtaining high purity water. These methods include distillation, filtration or reverse osmosis. These methods generally require costly equipment, maintenance and extensive energy outlays. Distillation requires large amounts of electrical energy but fails to produce sufficient quantities of high purity water. Where filtration is used, large amounts of these expensive materials are required to achieve the desired purity levels. The filter media used tend to plug easily, requiring frequent replacement. Reverse osmosis requires extremely precise water conditions and constant monitoring to work effectively. Additionally, the osmotic media are extremely fragile and produce too little water to be cost effective in general applications. Thus, the costs of employing such methods are prohibitive for the individual or small commercial user. Such users are forced to rely on bottled purified water. Bottled water is expensive and does not ensure the user with a steady source of pure water on demand.

Additionally, most purification methods and media presently employed are contaminant-specific. A specific method or purification system is effective for the removal of only a certain class of contaminants, i.e., specific organics, inorganic salts or the like. If removal of a variety of contaminants is desired, several different purification methods or media must be employed. Such multi-contaminant purification systems are cumbersome and costly to maintain. Additionally, premature failure of one purifying method or media requires costly replacement, usually by a skilled technician, if production of high purity water is to be maintained.

Where water purification is performed, ion exchange resins are a commonly used water purification media. Ion exchange resins are designated as either cationic exchange resins, anionic exchange resins, or mixtures thereof. Ion exchange resins are capable of producing hydrogen or hydroxide ions which interact with ionic contaminants found in the water; binding them to the resin and rendering them innocuous.

Ion exchange resins of this type maintain a capacity to remove ionic contaminants, expressed as kilograms of removal (kgr) per cubic foot of the resin used. Thus, the capacity of the resin is the total amount of water which can be purified before the resin is "processed to exhaustion" i.e., the amount of total dissolved solids of the outgoing water after passage through the resin, equals that of the incoming water.

These ion exchange resins are generally used in confined cylindrical, fiberglass tanks. These vessels vary in dimensions from about 6 inches by 18 inches to about 36 inches by 72 inches; diameter to height, respectively. In tank sizes ranging from 6"×18", to 10"×54" (most commonly used in exchange systems) the tanks are fitted with distributor assembly. The assemblies consist of an inlet and outlet, located perpendicular to one another along the longitudinal plane. A fitting at the side allows water into the tank. The fitting at the side allows water into the tank. The fitting at the top contains a tube (also called a standpipe) extending to the bottom of the tank. Water is forced through the bed to the bottom of the tank, then through the standpipe located in the center of the tank.

The effectiveness of ion exchange resins is dependent on the contact of each unit of water with each successive resin bead. As each unit of water comes in contact with each bead, an incremented amount of contaminant is removed. Thus, the more contact between water and resin permitted, the more contaminant removed.

The present design of cylinders containing ion exchange resin permits only limited contact between water and resin beads. Because water will follow a path of least resistance through the center of the cylinder, the resin at the sides of the cylinder is only minimally exposed and contacted. This greatly reduces efficiency of the resin and the total purification cylinder. Additionally, the configurations of the various present purification devices do not provide means for effectively combining various purification methods in series.

Thus, it is desirable to provide a method and apparatus for purifying water which increases the effectiveness of the purification media used. It is also desirable to provide a method and apparatus from which high purity water can be obtained which requires a reduced amount of purifying media without sacrificing the total purifying capacity of the device. It is also desirable to provide a method and apparatus for purifying water which is economical, requires minimum space, and is easily serviced and replaced when the purification media is exhausted. It is also desirable that the method and device be suitable for combining a variety of purification media in admixture or in discrete segments as required.

SUMMARY OF THE INVENTION

The present invention is a method and apparatus for removing impurities in water. In the method of the present invention, the water to be purified comes into contact with various purifying media for a specified period. The various purifying media are contained in a plurality of fixed beds through which the water to be purified is conveyed. If desired, the water can then be exposed to ultraviolet light at a wavelength between about 245 nm to about 260 nm after the water has contacted the purifying media to ensure that the water is free from bacterial contamination. The method of the present invention is contemplated as a continuous process in which water is conveyed through purifying media and past the UV light source in a continuous fashion. The method of the present invention increases the quality and amount of treated water produced over previous methods.

The apparatus of the present invention comprises a multi-chamber unit, a water purity measurement system and, optionally, a bacteriocidal treatment system. The multi-chamber unit is comprised of a plurality of serially disposed chambers contained within a casing. The casing has an inlet and an outlet for permitting water to enter an initial chamber and treated water to exit a final chamber. Each chamber contains a water purification medium. Examples of such water purification media can include ion exchange resins, activated carbon and the like. The chambers are maintained in fluid communication with one another and are positioned such that the water must follow a tortuous path as it progresses from chamber to chamber within the casing. Preferably, one or more chambers contain sub-chambers for better introduction of ionically contaminated water to the resin.

The apparatus may also have an optional bacteriocidal treatment system. The bacteriocidal treatment system generally includes a translucent or transparent tube through which the purified water is directed after it exits the multi-chamber unit and a source of ultraviolet light in close proximity to the tube. The bacteriocidal treatment system, when present in the water purification system of this invention, is in fluid communication with the outlet of the casing of the multi-chamber unit.

Also included with the apparatus is a water purity measurement system located downstream of the multi-chamber unit. The purity is measured by meters which project into a water-conveying conduit to measure the resistivity of the water. The resistivity measured is converted into a visually readable signal.

The apparatus is also equipped with appropriate pumps, conduits and metering devices to convey a water stream through the apparatus and to control and monitor its flow.

BRIEF DESCRIPTION OF THE DRAWINGS

The various features, advantages and other uses of the present invention will become more apparent by referring to the drawings and the following detailed description in which.

DESCRIPTION OF THE PREFERRED EMBODIMENT

Water to be purified can be derived from any number of sources such as municipal water systems, as well as various streams and lakes and the like. Water containing impurities such as metal salts, halogens, various organic compounds and biological material at concentrations between about 120 ppm and about 35,000 ppm can be purified to a level measured as megohms conductivity by the method and apparatus of the present invention. It has been found that employing the method and apparatus of the present invention increases the volume of water which can be produced at a specified purity.

In the method of the present invention, the water to be purified is brought into contact with any of a variety of purifying media in a manner which induces reverse turbulence within the fluid stream. The purifying media used can include an initial fibrous filter of activated carbon, as well as various ionic resins. The activated carbon preferred comes in the form of pellets such as that commercially available from Calcon Corp. and Teledyn Corp. When activated carbon is used, it is generally employed as an initial purification zone to remove gross amounts of organic contaminants such as phenols, halogens, etc. In general, the time in which the water is exposed to the activated carbon constitutes between about 5 and about 10 percent of the total purification time. It is to be understood that, in purifying water having lower levels of contaminants, the initial contact with activated carbon may potentially be omitted.

After the water has contacted the purification media in the initial purification zone, it is then brought into contact with a series of ion exchange media contained in one or more fixed beds. Contact between the ion exchange media and the water will remove ionic contaminants present in the water, particularly those present as inorganic salts.

Ion exchange media which can be successfully used in the present invention include various commercially available cationic, anionic, or mixed ion exchange resins having a particle size of between about 16 and about 50 wire mesh. Such resins are commercially available from Sybron Corporation of Birmingham, N.J. under the trademark IONAC, Dow Chemical Company of Midland, Michigan under the trademark DOWEX, or Rohm and Haas of Philadelphia, Pa. under the trademark AMBERLITE.

The water is directed past beds containing a variety of resins. The beds may contain a mixed resin containing between 20 percent to 50 percent anionic resin and between about 80 percent to about 50 percent cationic resin. Alternately, the water can be directed through a series of beds containing discrete anionic and cationic resins to contact the same. The beds can be arranged so that alternate beds contain anionic and cationic resins to insure a systematic removal of contaminants. In the preferred embodiment, about 20 percent to about 40 percent of the total purification time in the multi-chamber unit constitutes contact with the anionic resin, and about 40 percent to about 60 percent of the total purification time in the multi-chamber unit constitutes contact between the water and the cationic resin.

It has been unexpectedly found that by introducing reverse turbulence into the stream of water as it passes through the fixed beds, the quantity of water which can be purified by exposure to a given amount of purification media is drastically increased. It is also possible to decrease the total amount of purification media employed by as much as 40 percent without sacrificing purification efficiency. Without being bound to any theory, it is hypothesized that the reverse turbulence introduced permits more intimate and efficient contact between the purification media and the contaminants contained in water, which enables the purification media to function more efficiently.

Reverse turbulence in the flow of the water stream may be induced in a variety of ways. The preferred manner will be described in greater detail subsequently.

The water purified by the method of the present invention can also be subjected to bacteriocidal treatment to eliminate any undesirable microorganisms. In the preferred embodiment, the water is exposed to ultraviolet radiation at a wavelength between about 245 nm and about 260 nm, preferably at about 254 nm. In order to expose the water to the ultraviolet radiation, the water is conveyed through translucent or transparent tubing in close proximity to a UV light source. The preferred apparatus for effecting this purification will be described in detail subsequently.

Finally, the purity of the water produced can be monitored by a series of conventional electrical conductivity meters. Water produced by the method of the present invention is suitable for use in a variety of applications.

The method of this invention may be employed using the apparatus described below. The apparatus 10 of the present invention has an outer housing 12 such as that shown in FIG. 1. The housing 12 may be constructed of multiple pieces which are fitted together. The outer housing 12 contains a multi-chambered water purification unit 14, an optional bacteriocidal treatment unit 16 and an optional water purity measurement unit 18. The apparatus 10 of the present invention may also be optionally equipped with suitable pumps, valves and other metering devices (not shown) to provide a steady flow of water through the apparatus 10. These can be contained within the outer housing 12 or external to it as required.

Figure 1:
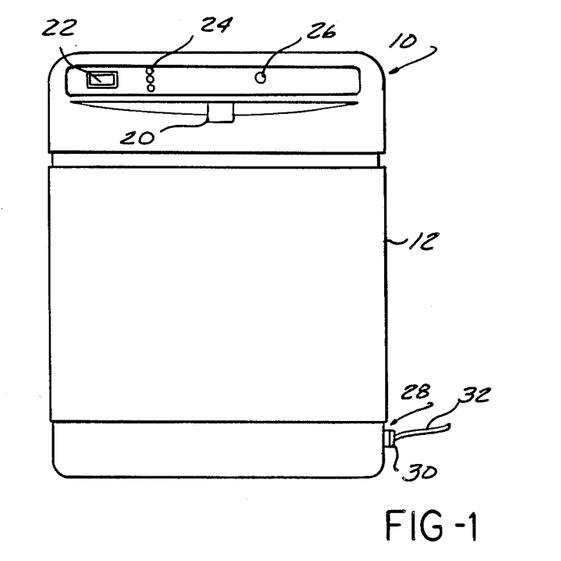
FIG. 1 is a front view of a water purification apparatus constructed according to the teachings of the present invention.

The outer housing 12 also has an appropriate discharge means 20 for delivering the purified water to any desired container (not shown). Also contained on the outer housing 12 is a suitable power switch 22 to provide electrical power for the purity measurement devices 18 and bacteriocidal treatment unit 16 as required. The power source may be external AC or DC current or internally contained power sources such as batteries (not shown). Such power sources and circuits therefore are known to those skilled in the art.

The outer housing 12 may also be equipped with suitable water purity indicator lights 24 which will be explained in detail subsequently and indicator lights 26 to monitor the use of the bacteriocidal treatment unit 16. Also included in the outer housing 12 is a suitable water inlet port 28 to permit water to enter the housing. In the preferred embodiment, the inlet port 28 is an aperture having an appropriate fitting 30 (shown in FIG. 2) which is connected to the multi-chambered unit 14 and permits connection of a suitable hose 32 thereto. The hose 32 is also connected to any suitable water source.

Figure 2:
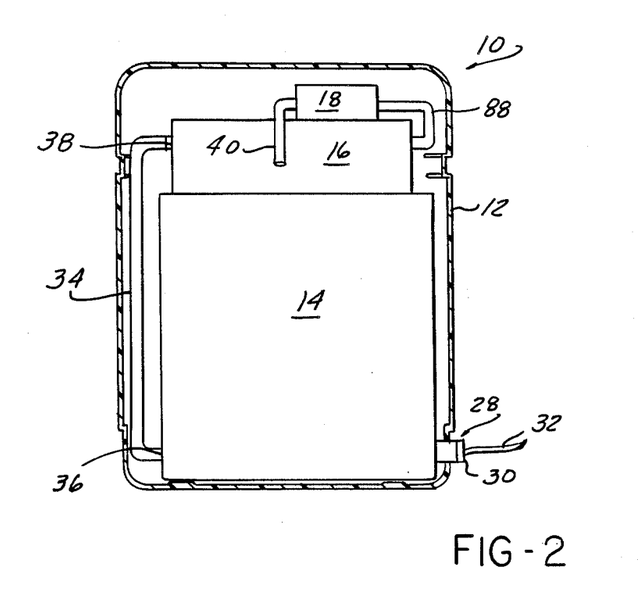
FIG. 2 is a front view of the device of FIG. 1 with the front panel removed.

The multi-chambered unit 14, bacteriocidal treatment unit 16 and water purity measurement unit 18 are all contained within the outer housing 12 in a manner such as that shown in FIG. 2. The multi-chambered unit 14, bacteriocidal treatment unit 16 and water purity measurement unit 18 may be anchored in the outer housing in any desired manner.

Also contained within the housing 12 is a connecting pipe 34 connected to an exit port 36 and to an inlet opening 38 (shown in FIG. 2) for conveying the water from the multi-chamber unit 14 to the bacteriocidal treatment unit 16. A discharge pipe 40 is connected to the water purity measurement unit 18 to convey water from the measurement unit 18 to the discharge means 20. The connecting pipe 34 and discharge pipe 40 may be constructed of any suitable inert material, such as polyethylene, polypropylene and the like, and can be either flexible or rigid as desired.

Figure 3:
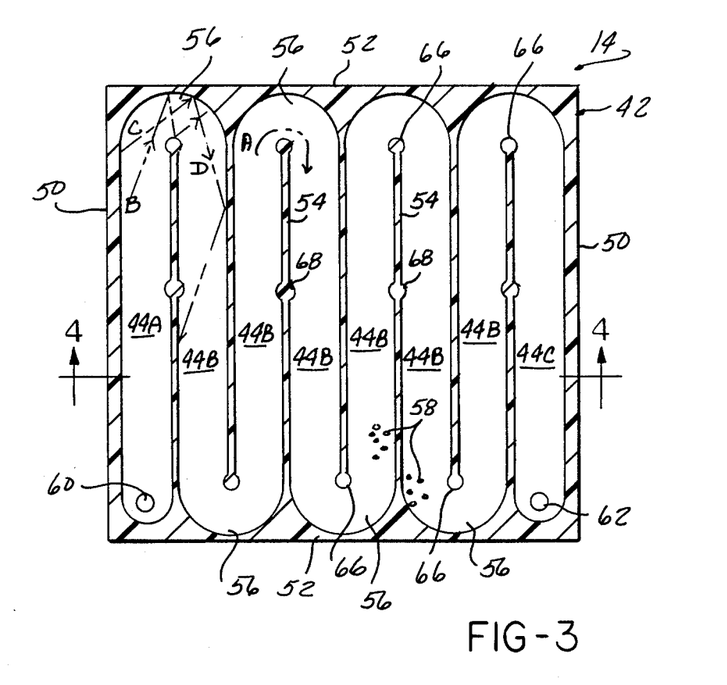
FIG. 3 is a cross-sectional view taken through the multi-chamber unit shown in FIG. 2.

One embodiment of the multi-chamber unit 14 contained within the housing 12 is shown in FIG. 3 and is composed of a plurality of serially disposed elongated chambers 44 which include an inlet chamber 44A, a plurality of intermediate chambers 44B and an outer chamber 44C in fluid communication with one another disposed parallel to one another within the casing 42. Each chamber 44 contains a desired water purification medium which will be described in detail subsequently. While eight chambers 44 are shown in FIG. 3, it is to be understood that any number of chambers 44 can be employed in the apparatus 10 of the present invention.

Figure 4:
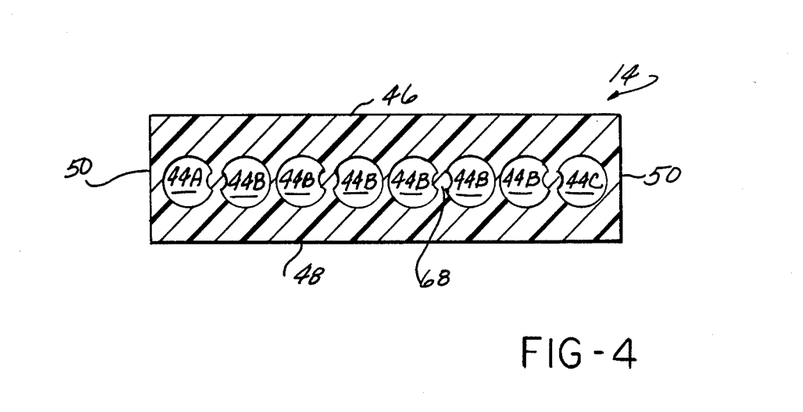
FIG. 4 is a lateral cross-sectional view of the multi-chamber unit shown in FIG. 2.

In the embodiment shown FIGS. 3 and 4 the chambers 44 are integrally formed in a molded casing 42. Each chamber 44 preferably has a circular cross-sectional diameter, but can have any configuration desired. The casing 42 itself has an upper wall 46, a lower wall 48, a pair of elongated side walls 50 perpendicularly disposed relative to the upper wall 46 and lower wall 48 and parallel t the elongated chambers 44. The casing 42 also has a pair of end walls 52 perpendicularly disposed between the upper wall 46 and lower wall 48 and the pair of elongated side walls 50.

A plurality of dividers 54 extend perpendicularly from between the upper wall 46 and the lower wall 48 to further define the chambers 44. As shown in FIG. 4, these dividers extend integrally from the upper wall 46 and the lower wall 48 and have a pair of opposed convex faces to further define the chambers 44. The dividers 54 are integrally formed to extend outwardly in an alternate direction from one of the end walls 52 to terminate at a spaced distance from the opposing end wall 52.

Also formed in end walls 52 between the bases of the respective dividers 54 contiguous therewith are convex interior surfaces 56. The chambers 44, dividers 54 and convex interior surfaces 56 combine to form a sinuous pathway through which the water to be purified travels. The general path by which the water travels is denoted by arrow A in FIG. 3. The configuration of the dividers 54, convex interior surfaces 56 and chambers 44 themselves cooperate to introduce reverse turbulence into the fluid flow through the chambers 44. While the general direction of the fluid flow is forward, as denoted by arrow A, individual sub-eddies are created by the interaction of portions of the water stream with the end walls 52 and dividers 54 in the manner exemplified by dashed lines and arrows B through D. As can be appreciated, the various pathways which the water can take creates eddies and swirls within the chambers creating the phenomenon designated as "reverse turbulence." Reverse turbulence can also create a backwashing effect leading to more intimate contact between the water and impurities contained therein and purification media 58 maintained in fixed beds within the chambers 44 which will be described in greater detail subsequently.

The casing 42 has an inlet aperture 60 located at one end of the first chamber 44A which permits water to enter into the multi-chamber unit 14. The inlet aperture 60 is in fluid communication with the water inlet port 28. In the preferred embodiment, the inlet aperture 60 is an opening between about one eighth and about three quarters of the width of the first chamber 44A. The casing 42 also has an outlet aperture 62 in fluid communication with the connecting pipe 34 for conveying the water from the final chamber 44C. The apertures 60, 62 can be equipped with a variety of conventional fittings (not shown) to secure water inlet port 28 and pipe 34. In the preferred embodiment, the chambers 44 are generally the same length. However, their total volume and configuration may vary depending on the filter media contained within.

The chambers 44 are positioned such that the water must progress along the sinuous path denoted by arrow A in FIG. 2 as it passes sequentially through each chamber. In the multi-chambered unit 14 of the present invention, each chamber 44 is filled with a desired purification media 58. The purification media 58 may be selected from any variety of resins, adsorptive media, absorptive media, etc. The media is, preferably, granular bead-like to facilitate backwashing in the chambers 44. However, the purification media 58 may have any suitable configuration. In the preferred embodiment, at least one of the initial chambers 44A can contain an activated carbon of a type previously described in connection with the method of the present invention, and activated carbon can be employed to remove gross impurities contained in fixed relationship therein.

The remaining chambers 44B with 44C preferably contain selected ion exchange resins. The ion exchange resins can be of the type previously discussed. In general, cationic resins and anionic resins of the type outlined previously are employed in alternating chambers. Mixed resins may be used in any or all of the chambers 44.

The granular or bead-like purification media is, preferably, fixedly contained within the multi-chamber unit 14 by any suitable means (not shown). Examples of such fixing means can include screens and the like. The presence of the granular or bead-like purification media 58 in the chambers 44 of the multi-chamber unit has also been unexpectedly found to increase fluid turbulence.

Without being bound to any theory, it is believed that this reverse turbulence created within and between the chambers 44 permits more intimate contact between the water and the entire amount of the purification media 58 eliminating major fluid flow pathways and permitting greater and more efficient purification of the water as it passes through and contacts each resin bed.

Figure 5:
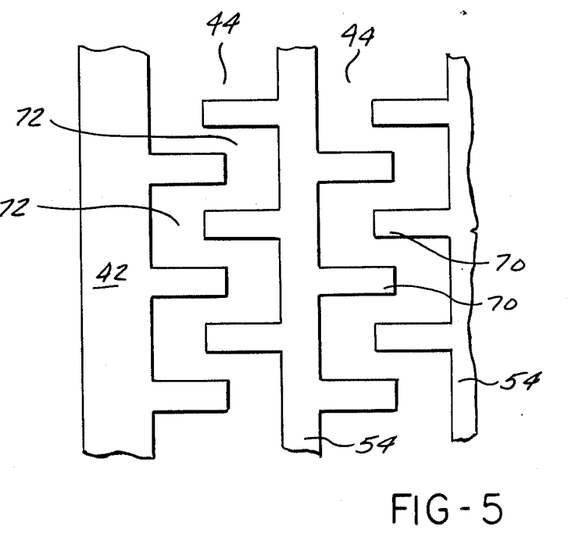
FIG. 5 is a detailed view of a portion of a single chamber such as those shown in FIG. 3 detailing sub-chamber flow-directing panels.

Other turbulence inducing devices can be inserted in the chambers 44 to induce and encourage greater reverse turbulence. These can include terminal moguls 66 located on the ends of dividers 54 and intermediate moguls 68 located along the surface of the dividers 54. These moguls 66,68 can extend annularly around cylindrical chambers 44 or can be scattered as hemispherical members along the interior of these chambers 44.

the chambers 44 may also contain other optional turbulence-inducing devices such as the sub-chamber panels 70 shown in FIG. 5. Each sub-chamber panel 70 extends latitudinally across the chambers 44 from an associated divider 54 or sidewall 50 to constrict or cover between about thirty percent and about ninety percent of the chamber opening, thereby defining constricted sub-chamber openings 72. The sub-chamber panels 70, preferably, extend alternately from opposing dividers 54 or sidewalls 50 to form a sinuous path through each chamber 44. The sub-chamber panels 70 can be constructed from a solid material, a screen-like mesh or filter media to increase turbulence into the fluid stream as the water passes through the purification media 58 contained within each chamber 44, thereby insuring intimate contact between all portions of the purification media 58 and the water to be purified.

Figure 6:
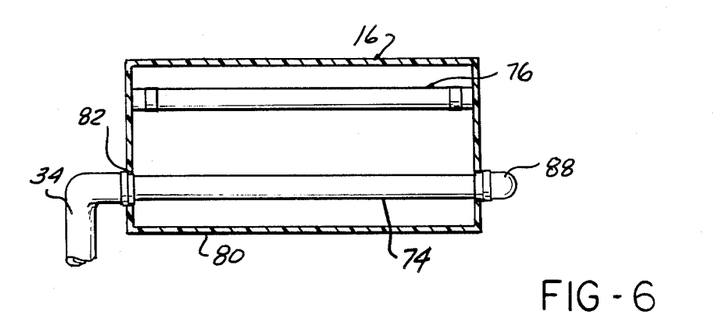
FIG. 6 is a front view of the bacteriocidal treatment unit according to the present invention shown in FIG. 2 with the front panel removed.

The water purification apparatus 10 of the present invention may, optionally, include a biocidal treatment unit 16 as shown in FIG. 1 and in greater detail in FIG. 6. The biocidal treatment unit 16 comprises a transparent or ultraviolet permeable conduit 74 through which water treated in the multi-chambered purification unit 14 is conveyed. Also included is a source of ultraviolet light 76 placed in close proximity to the conduit 74. The ultraviolet light source 76 is preferably a cylindrical tube positioned parallel to the conduit 74. The conduit 74 can be constructed from any ultraviolet-admitting material selected from the group consisting of quartz, glass or polymeric substances such as those marketed under the trade name TEFLON.

Both the ultraviolet light source 76 and the conduit 74 are, preferably, housed within a suitable casing 80. The casing 80 may also contain suitable electrical contacts, wires etc (not shown) to provide electrical current to the ultraviolet light source 76. Also optionally present within and on the casing are appropriate couplings 82 located at the inlet of conduit 74 and the outlet 86. The coupling 82 located at the inlet permits the junction between the conduit 34 and the biocidal treatment conduit 74. The coupling 82 located at the outlet 86 permits a junction between conduit 74 and an intermediate conduit 88. There may also be suitable flow control and measurement devices (not shown) present within the casing 80 as required or desired to monitor and maintain suitable flow rates therethrough.

The biocidal treatment unit 16 may be positioned upstream or downstream of multi-chambered purification unit 14 depending upon the microbial contamination of the inlet water and the end use of the purified water. In the preferred embodiment, the biocidal treatment unit 16 is located downstream of the purification unit 14. In most circumstances it has been found that biocidal treatment subsequent to removal of chemical contaminants is most effective in removal of microbial contamination such as E. Coli and other undesirable microorganisms.

The water purification apparatus 10 of the present invention may also include an optional water purity measurement unit 18 located downstream of the purification unit 14. In the preferred embodiment, water purity measurement unit 18 is located in or adjacent to conduit 88. Such a unit 18 is shown in detail in FIGS. 7 and 8.

Figure 7:
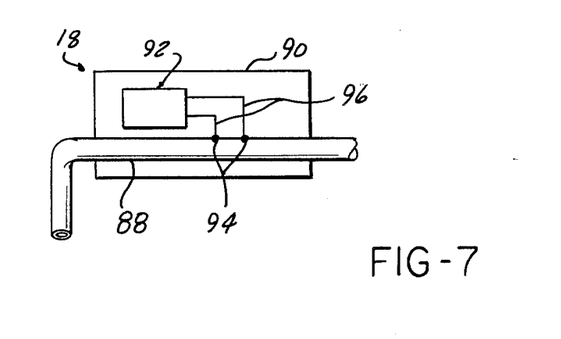
FIG. 7 is a schematic diagram of the purity sensor employed in the present invention.

The purity measurement unit is, preferably, housed within a casing 90 which contains the water purity tester system 92 and the conduit 88. The conduit 88 has appropriate water-tight openings 94 which permit the extension of suitable probes 96 into the moving water stream. The probes 96 are constructed of relatively inert conductive material which does not corrode or dissolve upon contact with water, or degrade with continued use. In the preferred embodiment, the material chosen was tungsten or a tungsten alloy. Preferably, purity is measured as resistance of the water in ohms and converted to parts per million contamination if desired.

Figure 8:
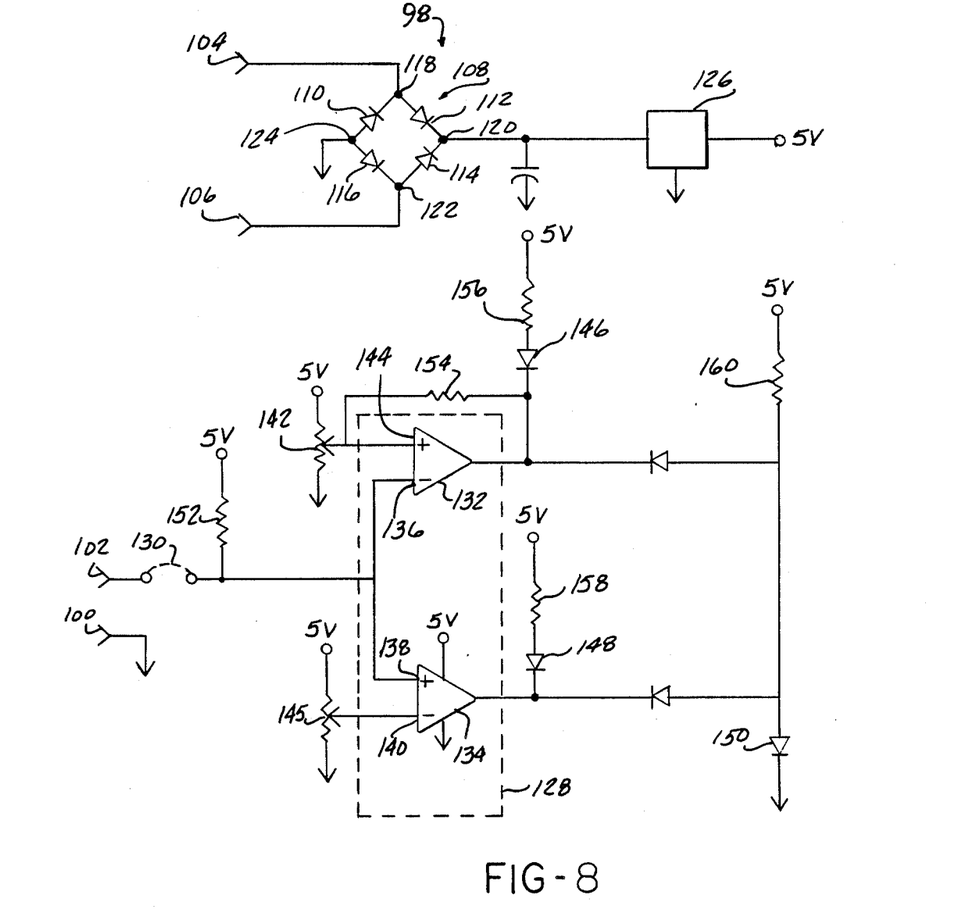
FIG. 8 is a detailed circuit diagram of the purity sensor of the present invention.

The preferred tester system is shown in detail in FIG. 8. The tester system 92 consists of a circuit 98 to which probes 96 are connected via wires 100, 102, 104, 106.

Wires 104 and 106 output to a full wave bridge rectifier 108 which consists of four diodes 110, 112, 114 and 116 connected in a conventional full wave rectifying bridge circuit. The leads of the diodes 110, 112, 114 and 116 are joined at terminals, such as terminal 118 between diodes 110 and 112, terminal 120 between the ends of the leads of diodes 112 and 114, terminal 122 between diodes 114 116, and and terminal 124 between the ends of the leads of diodes 116 and 110. To minimize the effects of supply voltage fluctuation and load current variation on the load voltage, a voltage regulator 126 is employed in the circuit.

Wire 102 leads into voltage comparator 128 via jumper cable 130. The voltage comparator 128 consists of two operational amplifiers 132 and 134. The negative input terminal 136 of operational amplifier 132 is connected to the positive input terminal 138 of operational amplifier 134. Potentiometer 142 inputs to the positive terminal 144 and, in the preferred embodiment, is adjusted to switch at 10 parts per million (PPM). Potentiometer 145 inputs to the negative terminal 140 of operational amplifier 134. In the preferred embodiment, potentiometer 145 is calibrated to switch at 5 PPM.

Green, yellow and red light emitting diodes 146, 148, and 150 respectively, are purity light indicators which operate to alert the consumer on whether to change the ionization filter bed of the water purification system.

In the preferred embodiment, resistors 152, 154, 156, 158 and 160 are all accurate to within plus or minus one percent of the given value to insure extreme accuracy of the water purification system.

Figure 9:
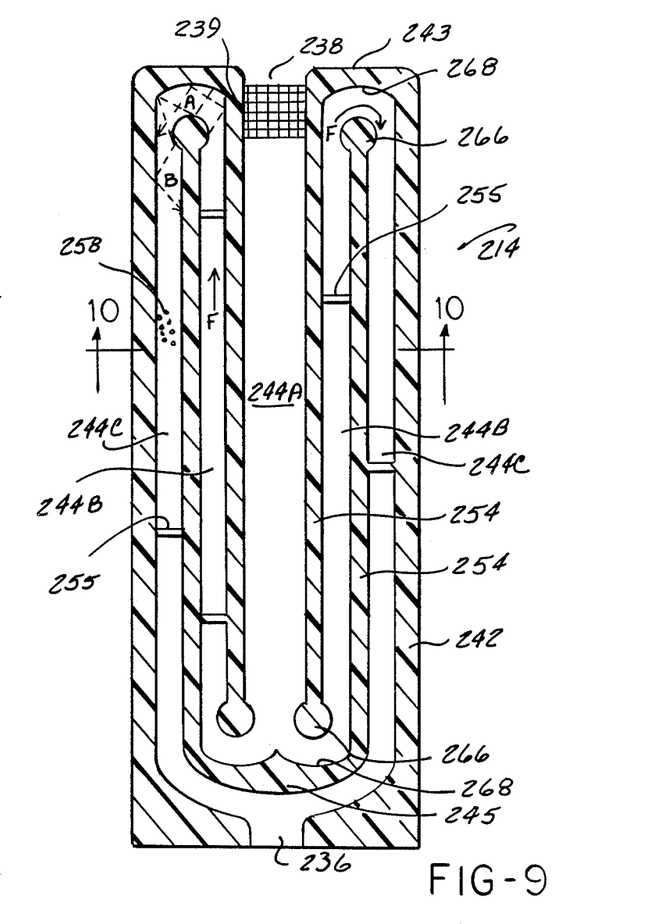
FIG. 9 is a longitudinal cross-sectional view of an alternate embodiment of the multi-chamber unit of the present invention.
Figure 10:
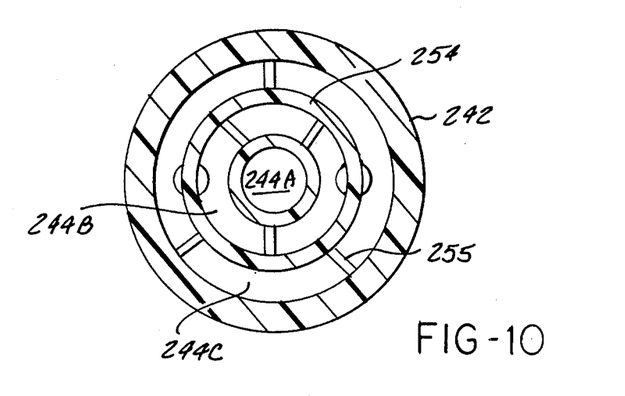
FIG. 10 is a latitudinal cross-sectional view of the multi-chamber unit shown in FIG. 8.

An alternate embodiment of a suitable multi-chambered water purification unit is shown in FIGS. 9 and 10 at reference numeral 214. The multi-chambered water purification unit 214 of this second embodiment includes an elongated cylindrical housing 242 formed with an outer diameter such that the assembly may be positioned in the outer housing 12 of the apparatus 10 of the present invention.

The major portion of the length of the housing 242 is formed with a plurality of chambers 244 which are filled with particles or pellets of water purifying media 258 such as were described previously.

The multi-chambered unit 214, preferably, has an inlet opening 238, preferably located in an end portion of the casing 242. An annular filter element 239 can be located immediately adjacent to the inlet opening 238 so that all water entering casing 242 must pass therethrough. Filter element 239 can serve to maintain water purifying media 258 in position in chambers 244.

In the preferred embodiments, water is introduced through a central chamber 244A and on into intermediate chambers 244B. It is within the purview of this invention to have a plurality of intermediate chambers 244B. The water stream exits the left chamber 244B and is carried into a final chamber 244C prior to being dispersed out of the multi-chambered water purification unit 214 through an exit port 236. Connecting pipe 34 can be attached at that point by any conventional means.

Each chamber 244 can be formed by a plurality of dividers 254. Dividers 254 are generally concentrically oriented in the casing 242

The dividers 254 may be of any configuration which will permit them to remain in their concentric orientation. As shown in FIG. 9, connectors 255 are a series of spaced struts located intermittently along chambers 244 and extending perpendicularly between two dividers 254 or between divider 254 and casing wall 242. The dividers 254 and connectors 255 assist in introducing reverse turbulence.

The dividers 254 can also have terminal moguls 266 located at the terminal ends of dividers 254. Preferably, the moguls 266 are positioned opposite curved interior portions 268 located in end walls 243 or intermediate end walls 245. The positioning of the terminal moguls 266 in relation to the curved interior potion 268 permits the introduction of reverse turbulence which increases the purification efficiency of the resins. Additional turbulence can be added to the fluid flow by the presence of connecters 255. It is to be understood that any number of chambers 244 can be employed in this embodiment of the present invention. Furthermore, if desired, various other turbulence increasing devices can be added to the interiors of the chambers 244 to increase reverse turbulence therein.

For a more complete understanding of the present invention, reference is made to the following examples. These examples are to be construed as illustrative rather than limitative of the present invention.

EXAMPLE I

A test was run using a purifier constructed according to the present invention having a total bed volume of two liters divided into eight cells or chambers. An initial cell contained activated carbon. The remaining seven cells contained anionic resin.

The calculated purification capacity of the purifier was found to be 15.8 kgr/ft$^3$ as determined from the following data. A 500 ppm sodium chloride solution having a resistance of 1 megohm-cm was run through the unit at a rate of 700 ml/min. This was continued with periodic monitoring of the resistance of the treated sodium chloride solution. After 171 minutes, it was determined that the resistance of the treated water had dropped below 1 megohm-cm. Because the resistance of the influent equalled that of the effluent, exhaustion of the bed was indicated.

The purifier beds were then rinsed with a slow rinse up with 18 megohm-cm deionized water. After 20 unit volumes has been passed through the unit, the effluent water showed a resistance of about 5 megohm-cm. At this point exhaustion of the resin should have been achieved.

Additional amounts of the 500 ppm sodium chloride solution were than passed through the purifier while the resistivity of the effluent was monitored. The resistivity throughout the second run, after an initial drop, remained constant in the range of 3.5 to 4 megohm-cm. Thus, the purifier of the present invention delivered a greater capacity than expected from a unit containing the volume of resin.

EXAMPLE II

A purifier constructed according to the present invention similar to that shown in FIGS. 1, 2 and 3 was employed to purify quantities of water. The purifier has a total bed volume of 2 liters divided into beds of equal volume. The purifier, in sequence, contained a prefiltration screen, an activated charcoal bed, a bed containing anionic resin, a bed containing mixed anionic and cationic resin, a final charcoal bed and a final micron mesh screen. The flow rate of the water was 700 ml/min.

A representative sample of water from a major municipal source was taken and tested by conventional methods. It was found to have an initial hardness of 102 mg/L based on $CaCO_3$. This sample was passed through the purifier. After passing through the purifier, the water had a hardness of 1.0 mg/L based on $CaCO_3$.

A second sample of water was taken from a representative well located in Goodrich, Michigan. After testing, it was found to have a hardness level of 372 mg/L based on $CaCO_3$. Qualitative analysis also indicated levels of chlorides present in the sample. The sample was run through the purifier described above. The resulting effluent showed hardness levels less than 1.0 mg/L based on $CaCO_3$ and tested negatively for the presence of the chlorides.

Thus, the purifier constructed according to the present invention is highly effective in reducing water hardness and chloride content of water.

EXAMPLE III

A purifying device such as that described in Example II was used to purify household tap water from a private well. In addition to the tests described in Example II, the sample was exposed to ultraviolet light after passing through the purification medium.

A bacteriological analysis of the water sample was performed before and after purification. Prior to purification, the water sample showed Coliform bacteria in an amount of 1MF Coliform units per 100 ml solution. After purification, no evidence of Coliform bacteria was found.

EXAMPLE IV

A sample of water was purified using the device and parameters described in Example II. The sample was analyzed for a variety of contaminants before and after purification. As is indicated by the results shown in Table I, a significant drop in all impurities was detected after purification.

TABLE I

| WATER PURITY BEFORE AND AFTER TREATMENT | | |
|---|---|---|
| Impurity | Level Detected Before Purification | Level Detected After Purification |
| Copper | 0.018 | none detected |
| Iron | 0.044 | none detected |
| Lead | 0.029 | none detected |
| Manganese | trace | none detected |
| Sodium | 31 | none detected |
| Zinc | 0.095 | 0.008 |
| Alkalinity (Total as ppm $CaCO_3$ | 110 | none detected |
| Chloride | 50 | none detected |
| Fluoride | 1.500 | none detected |
| Nitrate | 2 | none detected |
| Sulphate | 66 | none detected |
| Hardness (As ppm $CaCO_3$ | 230 | 0 |
| Total Solids (As ppm NaCl) | 495 | none detected |
| Chloroform | .004 | .002 |
| Bromodichloromethane | .001 | .001 |

EXAMPLE V

An additional test was run using the purification device and parameters described in Examples II. The purifier contained the following resins in a plurality of discrete beds in the order listed: 10.6 cubic inches of Sybron Ionac ASB-1P anionic exchange resin; 15.8 cubic inches of Sybron Ionac C-267 cation exchange resin; and 26.4 cubic inches of Sybron Ionac NM 75 mixed bed exchange resin. Theoretical exhaustion was calculated at 58 gallons for water containing 130 ppm contaminant based on removal capacities of 18.4 Kg per cubic foot for the cationic resin, 14.5 Kg per cubic foot for the anionic resin and 12.7 Kg per cubic foot for the mixed bed resin.

The source of water containing 130 ppm contaminants was purified by passing it through the purifier of the present invention. A water flow rate of 0.25 gal./min. was established through the resins. The effluent was tested at intervals to determine where exhaustion was reached. The test results are summarized in Table II. As can be seen from these results, the total quantity of water which was purified before actual exhaustion was reached was 99 gallons. The amount purified was almost double the theoretical yield.

TABLE II

| WATER PURITY AFTER TREATMENT HAVING AN INITIAL CONTAMINANT LEVEL OF 130 PPM | |
|---|---|
| Amount of Water (gallons) | Total Contaminants (ppm) |
| 5 | 0.25 |
| 20 | 0.25 |
| 25 | 0.50 |
| 30 | 0.50 |
| 35 | 1.00 |
| 40 | 1.50 |
| 45 | 4.00 |
| 50 | 11.00 |
| 55 | 17.00 |
| 60 | 32.00 |
| 65 | 55.00 |
| 70 | 80.00 |
| 75 | 95.00 |
| 80 | 110.00 |
| 85 | 115.00 |
| 90 | 120.00 |

TABLE II-continued

WATER PURITY AFTER TREATMENT HAVING AN INITIAL CONTAMINANT LEVEL OF 130 PPM

| Amount of Water (gallons) | Total Contaminants (ppm) |
| --- | --- |
| 95 | 125.00 |
| 99 | 130.00 |

Having thus described the invention, what is claimed is:

1. A method for purifying aqueous media comprising the steps of:
orienting the aqueous media in a steady stream;
introducing the stream sequentially into a plurality of purification zones, the purification zones containing granular purification media contained in fixed beds and a plurality of stream-deflecting, turbulence inducing elements disposed therein;
contacting the turbulent aqueous stream to be purified with activated carbon contained within at least the first purification zone; and then
contacting the turbulent aqueous stream with a plurality of ion exchange resins, the total ion exchange resin comprising from about 40 to about 80% of an anionic exchange resin, from about 20 to about 60% of the ion exchange resin being a cationic exchange resin and the remainder being a mixed cationic-anionic ion exchange resin.

2. The method of claim 1 wherein the carbon and ion exchange resins are contained in separate fixed beds.

3. The method of claim 1 further comprising exposing the aqueous media to a source of ultraviolet light at a wavelength between about 245 nm and about 260 nm.

4. The method of claim 3 wherein the ultraviolet light is at a wavelength of about 254 nm and the aqueous media is exposed subsequent to contacting the purification media.

5. The method of claim 1 wherein fluid turbulence is introduced into the aqueous stream during contact with the purification media, the fluid turbulence including reverse turbulence of the aqueous stream.

6. An apparatus for purifying aqueous media comprising:
a housing having an inlet aperture and an outlet aperture;
a multi-chamber unit disposed within the housing having an inlet in fluid communication with the inlet aperture and an outlet, the multi-chamber unit having a plurality of elongated chambers disposed serially therein, the chambers in fluid communication with one another, the chambers containing turbulence-inducing elements to induce non-linear flow and reverse turbulence and purifying media contained in fixed relation therein; and
means for measuring the purity of the aqueous media exiting the multi-chamber unit.

7. The apparatus of claim 6 wherein each chamber of the multi-chamber unit comprises:
a pair of longitudinal side edges disposed essentially parallel to one another;
a pair of longitudinal end surfaces perpendicularly positioned with respect to the side edges;
wherein the turbulence-inducing elements include a plurality of panels laterally oriented within the chambers, the panels attached to and extending between the longitudinal end surfaces and extending outward from a side edge to define a plurality of tortuous constricted passageways within the chamber, the panels extending from alternate side edges of the chamber and positioned to induce turbulence in the aqueous media passing therethrough.

8. The apparatus of claim 6 wherein the multi-chamber unit comprises:
an upper wall;
a lower wall disposed in essentially parallel relationship to the upper wall;
a pair of elongated side walls perpendicularly attached to the upper and lower wall and disposed in parallel relationship to each other;
a first end wall and a second end wall disposed perpendicularly to the upper and lower walls and to the side walls to define an essentially rectangular cavity;
a plurality of first dividers perpendicularly attached between the upper and lower walls of the casing positioned between the pair of side walls, the first dividers attached perpendicularly to the first end wall and extending outward therefrom to a position immediately adjacent to the opposing end wall to define slit-like openings therebetween; and
a plurality of second dividers perpendicularly attached between the upper and lower walls of the casing positioned between the pair of side walls parallel thereto, the second dividers attached perpendicularly to the second end wall extending outward therefrom to a position immediately adjacent to the opposing end wall to define a slit-like opening therebetween, the second dividers being positioned in an intermeshing relationship with the first dividers to form the plurality of chambers wherein the first and second dividers cooperate to form the chambers.

9. The apparatus of claim 8 further comprising a plurality of curvilinear flow directing surfaces located on the interior surface of the end walls.

10. The apparatus of claim 8 further comprising a plurality of panels perpendicularly attached between the upper and lower wall and extending perpendicularly outward from an associated first divider to a terminal position adjacent to the second divider, wherein the panels are alternately attached to the first and second dividers.

11. The apparatus of claim 10 wherein the panels each occupy between about 50 and about 90 percent of the cross-sectional area of the chamber.

12. The apparatus of claim 6 wherein the multi-chamber unit comprises:
a cylindrical casing having a first end and a second end and a cylindrical outer wall disposed therebetween.

13. The apparatus of claim 12 wherein the turbulence inducing elements comprise:
a plurality of curved terminal moguls located at the terminal ends of concentric cylindrical dividers.

14. The apparatus of claim 12 wherein the turbulence-inducing elements comprise:
a plurality of curved interior end surfaces located opposite cylindrical dividers.

15. The apparatus of claim 6 further comprising:
means for producing ultraviolet light; and
means for exposing the aqueous media to the produced ultraviolet light located immediately adjacent to the multi chamber unit.

16. The apparatus of claim 15 wherein the ultraviolet exposures means comprises:
a source of ultraviolet light, emitting light at a wavelength between about 245 and about 260 nm; and
an ultraviolet light admitting conduit for conveying the water to be purified past the ultraviolet light, production means the conduit having an inlet in fluid communication with the outlet of the multichamber unit.

* * * * *